United States Patent Office 3,444,146
Patented May 13, 1969

3,444,146
VULCANIZABLE OLEFIN COPOLYMERS AND
PROCESS FOR PREPARING THEM
Alberto Valvassori and Guido Sartori, Milan, Italy,
assignors to Montecatini Edison S.p.A., Milan,
Italy
No Drawing. Filed Dec. 11, 1964, Ser. No. 417,823
Claims priority, application Italy, Dec. 13, 1963,
25,717/63
Int. Cl. C08f 15/40, 27/02
U.S. Cl. 260—79.5        8 Claims

ABSTRACT OF THE DISCLOSURE

Vulcanizable amorphous copolymers of ethylene, a higher aliphatic alpha-olefin and a mixture of at least two non-conjugated polyenes prepared with a catalyst acting with co-ordinated anionic mechanism are described.

The present invention relates to a new class of substantially linear, amorphous, vulcanizable, high molecular weight olefin copolymers and to a process for preparing them with the aid of catalysts acting with a co-ordinated anionic mechanism.

It has been found according to the present invention that it is possible to prepare substantially linear amorphous vulcanizable high molecular weight copolymers, of one or more monomers selected from ethylene and aliphatic alpha-olefins having the general formula $$R\text{—}CH\text{=}CH_2$$

in which R is an alkyl group containing 1 to 6 carbon atoms and at least two monomers belonging to two or more of the following classes:

(a) alkenylcycloalkenes
(b) monocyclic non-conjugated polyenes
(c) aliphatic non-conjugated dienes
(d) cyclic monoolefins at least one of the monomers being selected from classes (c) and (d).

This result is to be considered as very surprising since, from the theory of copolymerization, it is known that in case of ionic polymerizations, there are remarkable differences in the reactivity between different monomers and therefore, unless the relative concentrations of the various monomers are very carefully selected, it is not always possible to introduce into a copolymer monomers in amounts substantially comparable with each other.

The class of monomers defined as monocyclic non-conjugated polyenes, and which may be used in preparing the present copolymers, comprises polyenes having preferably from 7 to 12 carbon atoms, like e.g., cycloheptadiene-1-4, cyclooctadiene-1-5, cyclooctadiene 1-4, cyclodecadiene 1-5, cyclododecadiene 1-7, 1-methylcyclooctadiene 1-5, 3-methylcyclooctadiene 1-5, 3-4 dimethylcyclooctadiene 1-5, cyclodecadiene 1-6 and cyclododecadiene 1-5.

The class of monomers defined as alkenyl cycloalkenes, and which are useful in preparing these copolymers comprises alkenylcycloalkenes having preferably from 5 to 12 carbon atoms in the ring and from 2 to 8 carbon atoms in the alkenyl chains, like e.g., 1-vinylcyclohexene-1, 4 - vinylcyclohexene - 1, 1 - hexene - 5′ - yl-cyclohexene-1, 3 - methyl - 4 - allyl - cyclohexene - 1, 1 - buten - 3′ - yl-cyclohexene-1, 1-allyl-cyclohexene-1, 3-buten-3′-yl-cyclopentene-1, 1-penten-4′-yl-cyclopentene - 1, 3 - methyl - 1-buten-3′-yl-cyclopentene-1, 2,3,3-trimethyl - 4 - vinyl - cyclopentene-1, 3,4-dimethyl-5-vinylcyclohexene-1, 3,5 - dimethyl-4-vinvyclohexene-1.

The class of monomers defined as aliphatic non-conjugated dienes, and which are useful, comprises dienes having preferably from 5 to 12 carbon atoms, like e.g., pentadiene 1-4, 2-methylpentadiene 1-4, hexadiene 1-5, 2-methyl-hexadiene 1-5, hexadiene 1-4, heptadiene 1-4, heptadiene 1-5, heptadiene 1-6, 6-methylheptadiene 1-5, octadiene 1-7, octadiene 1-5, 2,6-dimethyloctadiene 1-7, 3,7-dimethyloctadiene 1-6.

The useful cyclic monoolefins comprise monomers having preferably from 5 to 12 carbon atoms in the rings like e.g., cyclopentene, 3-methylcyclopentene, cyclohexene, cycloheptene, cyclooctene.

Four typical representatives of the aforementioned classes of monomers, namely cyclooctadiene 1-5, cyclooctene, octadiene 1-7 and 4-vinylcyclohexene-1, are present in variable proportions in mixtures obtained by partial hydrogenation of cyclooctadiene and pyrolysis of the product obtained.

At a temperature of about 500° C., the opening of cyclooctene occurs in the formation of octadiene-1-7 (Belgian Patent No. 610,030).

If the hydrogenation product still contains unreacted cyclooctadiene, by carrying out the pyrolysis at 700–900° C. the isomerization of cyclooctadiene to 4-vinyl-cyclohexene-1 takes place (U.S. Patent 2,574,481).

By starting with cyclooctadiene, therefore, it is possible to obtain mixtures containing cyclooctene, octadiene-1-7 and 4-vinylcyclohexene-1, in addition to unreacted cyclooctadiene, if any.

By controlling the hydrogenation and pyrolysis conditions, it is possible to vary the relative proportions of the components of the final mixture.

It has been found, according to the present invention, that it is possible to copolymerize one or more monomers selected from ethylene and aliphatic alpha-olefins with mixtures of monomers obtained by hydrogenation of cyclooctadiene followed by pyrolysis, thus obtaining copolymers consisting of monomeric units deriving from all the monomers used. Proceeding in this way, it is unnecessary to isolate the dienes deriving from cyclooctadiene, namely vinylcyclohexene and octadiene 1-7 in pure form through expensive fractional distillation processes.

In the case of monomeric mixtures containing vinylcyclohexene, there is the further advantage that, although this monomer does not appreciably reduce the polymerization yields, it reduces the molecular weight and makes it possible to obtain copolymers having a sufficiently low Mooney viscosity and a good workability.

Besides the mixtures as obtained by hydrogenation of cyclooctadiene followed by pyrolysis, fractions thereof obtained by distillation and containing only some of the aforementioned monomers can be used in preparing the present copolymers.

The olefins which can be used in the preparation of the copolymers according to the present invention, as said above, are selected from ethylene and aliphatic alpha-olefins having the general formula $R\text{—}CH\text{=}CH_2$ in which R is an alkyl group containing 1 to 6 carbon atoms, more particularly propylene and butene-1.

Each monomeric unit deriving from the polymerization of the polymers used and present in the macromolecules of the copolymers has a free unsaturation. The infrared spectrographic examination of the copolymers shows in fact the presence of unsaturations.

Theses unsaturations are reactive points for other reactions carried out on the copolymer.

The unsaturations make it possible, e.g., to vulcanize the copolymers with sulfur-containing mixes of the type commonly used for low-unsaturation rubbers. The double bonds present in the macromolecules permit the formation, e.g., by oxidation with oxone, of polar groups, such as e.g., carboxylic groups, which in turn can be used as reactive groups for other reactions (e.g., vulcanization with polyvalent basic substances), and can be utilized for improving the adhesivity of the polymer.

The double bonds may also be used in addition reactions with metal hydrides such as LiH, $NaBH_4$, $AlH(C_4H_9)_2$ etc.

The metal-to-carbon bonds thus formed can also be used for further reactions.

The copolymers have a substantially linear structure as demonstrated by the fact that these copolymers have properties (such as, more particularly, a viscous behavior) practically identical with those of known linear copolymers, e.g., linear ethylene-higher alpha-olefin copolymers.

The copolymers according to the present invention have a molecular weight, determined viscosimetrically, higher than 20,000. In fact, the intrinsic viscosity, determined in tetrahydronaphthalene at 135° C. or in toluene at 30° C., is higher than 0.5.

The composition of these new copolymers can be defined as practically homogeneous and the various monomeric units are distributed at random, therein.

A confirmation of the homogeneity of these new copolymers is found in the possibility of obtaining good vulcanized products therefrom by adopting the techniques normally used in the vulcanization of unsaturated rubbers, preferably of those having a low unsaturation content, such as butyl rubber.

As a confirmation of the fact that the unsaturations are well distributed along the chain, the vulcanized products thus obtained are wholly insoluble in the organic solvents, such as aliphatic hydrocarbons, and are swollen only to a limited extent by some aromatic solvents, whereas the copolymers per se, prior to vulcanization, are completely soluble in boiling n-heptane.

Moreover the vulcanized rubbers thus obtained show a very good mechanical strength and very low permanent set at break.

The rubbers have high reversible elastic elongations and, more particularly when reinforcing fillers such as carbon black are employed in the vulcanization mix, also possess high tensile strengths. The copolymers as such, in the non-vulcanized state, have the properties of non-vulcanized elastomers since they have a low initial modulus and a very high elongation at break.

Because of their good mechanical characteristics, the vulcanized elastomers can be used advantageously in the preparation of various manufactured articles, such as pipes, tire tubes, tapes, foils, elastic yarns, etc.

The copolymers can be extended or plasticized, in a way known per se, with hydrocarbon oils. Paraffinic or naphthenic oils are preferably used but aromatic oils can also be used.

The catalytic systems which may be employed in the process which is the object of the present invention are very dispersed, or amorphous colloidally dispersed or wholly dissolved in the hydrocarbons which may be employed as copolymerization solvents such as aliphatic, cycloaliphatic or aromatic hydrocarbons or mixtures thereof and are prepared from organometallic compounds of aluminum or beryllium and from vanadium compounds.

The organometallic compounds which may be used in preparing the catalysts are e.g., aluminum trialkyls, aluminum dialkylmonohalides, aluminum monoalkyldihalides, aluminum alkyl sesquihalides, aluminum alkenyls, aluminum alkylenes, aluminum cycloalkyls, aluminum cycloalkylalkyls, aluminum aryls, aluminum alkylaryls, aluminum dialkylalkoxides, aluminum alkylalkoxyhalides, complexes of the above cited organo-aluminum compounds with preferably weak Lewis bases, beryllium dialkyls, beryllium alkylhalides, beryllium diaryls.

Non restrictive examples of compounds belonging to the aforementioned groups are: aluminum triethyl, aluminum tri-isobutyl, aluminum trihexyl, aluminum diethyl monochloride, aluminum diethylmonoiodide, aluminum di-isobutylmonochloride, aluminum diethylmonofluoride, aluminum monoethyldichloride, aluminum ethyl sesquichloride, aluminum butenyldiethyl, aluminum isohexenyldiethyl, 2-methyl - 1,4 - di(diisobtylaluminum)-butane, aluminum tri(cyclopentyl-methyl), aluminum tri(dimethylcyclopentylmethyl), aluminum triphenyl, aluminum tritolyl, aluminum di(cyclo-pentylmethyl)monochloride, aluminum diphenyl monochloride, aluminum diisobutylmonochloride complexed with anisole, aluminum monochloromonopropyl monopropoxide, aluminum monochloro monopropyl monethoxide, aluminum monochloromonoethylmonoethoxide, aluminum diethyl propoxide, aluminum diethyl amyloxide, beryllium dimethyl, beryllium methylchloride, beryllium diethyl, beryllium di-n-propyl, beryllium diisopropyl, beryllium di-n-butyl, beryllium di-tert.butyl and beryllium diphenyl.

Vanadium compounds are used with the organometallic compounds to obtain the catalysts.

The preferred vanadium compounds are those which are soluble in hydrocarbons, such as halides and oxyhalides (e.g., $VOCl_3$, $VCl_4$, $VBr_4$); compounds wherein at least one of the metal valences is saturated by a heteroatom (in particular oxygen or nitrogen) linked to an organic group, such as e.g., vanadium triacetylacetonate and tribenzoylacetonate, vanadyl diacetylacetonate and haloacetylacetonates, vanadyl diacetylacetonate and haloacetylacetonates; vanadyl trialkoxides and haloalkoxides; and tetrahydrofuranates, etherates, aminates, pyridinates and quinolinates of vanadium tri- and tetra-chloride and of vanadyl trichloride. Hydrocarbon-insoluble vanadium compounds selected from the organic salts such as, e.g., vanadium triacetate, tribenzoate and tristearate may also be used.

In practice, in order to obtain the best results it is necessary to use halogen-containing catalytic systems, that is systems in which at least one of the catalyst-forming components contains halogen atoms.

The copolymerization may be carried out at temperatures between −80° C. and +125° C.

When the catalyst is prepared from vanadium triacetylacetonate, vanadyl diacetylacetonate, vanadyl haloacetylacetonates, or in general from a vanadium compound (such as, in addition to those already mentioned, $VCl_4$ or $VOCl_3$) and aluminum alkylhalides, it is desirable to carry out both the catalyst preparation and the copolymerization at temperatures in the range between 0° C. and −80° C., preferably between −10° and −50° C., in order to obtain high copolymer yields per weight unit of catalyst used.

Operating under said conditions, the catalysts show an activity much higher than that of the same catalytic systems prepared at higher temperatures. Moreover, when operating within the above indicated range of low temperatures, the activity of the catalysts remains practically unaltered for long periods of time.

When the catalyst is prepared from an aluminum alkylhalide and vanadium triacetylacetonate, vanadyl trialkoxide, or vanadyl haloalkoxide at temperatures in the range between 0° C. and 125° C., in order to obtain high copolymer yields it is advantageous to operate in the presence of particular complexing agents selected from ethers, thioethers tertiary amines or trisubstituted phosphines containing at least one branched alkyl group or an aromatic nucleus.

The complexing agent can be an ether having the formula RYR', in which Y is oxygen or sulfur and R and R' are linear or branched alkyl groups containing 1 to 14 carbon atoms or an aromatic nucleus containing 6 to 14 carbon atoms, at least one of R and R' being a branched alkyl group or an aromatic nucleus.

The complexing agent can be a tertiary amine having the formula:

in which R, R' and R'' each are in alkyl group containing 1 to 14 carbon atoms or an aromatic nucleus containing 6 to 14 carbon atoms, at least one of them being an aromatic nucleus.

The complexing agent can also be a tertiary phosphine having the formula:

in which R, R' and R'' are each an alkyl radical containing 1 to 14 carbon atoms or an aromatic nucleus containing 6 to 14 carbon atoms, at least one of them being an aromatic nucleus.

The amount of complexing agent is preferably between 0.05 and 1 mole per mole of aluminum alkylhalide.

The activity of the catalysts employed in the hereindescribed process varies with the molar ratio between the compounds employed in the catalyst preparation.

The Al/V or Be/V molar ratio in the catalyst systems may vary from 0.5:1 to 30:1. Higher ratios may be used.

However, it has been found that if aluminum trialkyls and vanadium halides or oxyhalides are used, catalysts in which the molar ratio of aluminum trialkyl to vanadium compound is between 1 and 5, preferably between 2 and 4, are preferred.

If, on the contrary, aluminum diethylmonochloride $$Al(C_2H_5)_2Cl$$

and vanadium triacetylacetonate (VAc$_3$) are used, the best results are obtained with an Al(C$_2$H$_5$)$_2$Cl/VAc$_3$ molar ratio between 2 and 20, preferably between 4 and 10.

The copolymerization may be carried out in the presence of an aliphatic, cycloaphatic or aromatic hydrocarbon solvent, such as e.g., butane, pentane, n-heptane, toluene, xylene, or mixtures thereof.

Halogenated hydrocarbons which are inert to the catalyst, such as e.g., chlorofrom, trichloroethylene, chlorobenzenes, methylene chloride, tetrachloroethylene, etc., can also be used as copolymerization solvent or diluent.

Particularly high copolymerization rates may be obtained if the copolymerization is carried out in the absence of an inert solvent by employing the monomers themselves in the liquid state, namely in the presence of a solution of ethylene in the mixture of higher alpha-olefins and of e.g. monomers obtained by hydrogenation and pyrolysis of cyclooctadient, kept in the liquid state.

In order to obtain copolymers having a high homogeneity of composition, the ratio between the concentrations of the monomers to be copolymerized, present in the liquid reacting phase, should conveniently be kept constant or at least as constant as possible during the copolymerization. To this end it may be convenient to carry out the copolymerization continuously by feeding and discharging in a continuous way a mixture of monomers of constant composition and operating with high flow rates.

The compositions of the copolymers may be varied within wide limits by varying the composition of the monomer mixture.

In spite of the different reactivity of the monomers forming e.g., the pyrolysis mixture, it is possible to obtain a copolymer containing monomeric units of each of the monomers used in the same ratios as in the raw pyrolysis mixture, if the copolymerization is carried out continuously by feeding the pyrolysis mixture of monomers in amount corresponding to that to be introduced into the copolymer and all the non-polymerized pyrolysis monomers are recycled.

By operating under these conditions the composition of the copolymer varies only at the beginning of the copolymerization, and a constant composition is obtained as soon as stationary conditions are reached.

Since the reactivity of propylene and of the monomers obtained by pyrolysis is remarkably lower than that of ethylene, it is possible to obtain copolymers of the desired composition by feeding into the reactor, e.g., first a solution of pyrolysis monomers and of propylene in excess and then regulating the ethylene pressure and the temperature so as to obtain the desired composition of the copolymer.

Another possibility consists of feeding first a monomeric mixture in which the components are present in such ratios as to give a copolymer in which the monomers deriving, e.g., from the pyrolysis, are present in the same relative concentrations as in the pyrolysis mixtures and then feeding the pyrolysis mixture itself. By using a process of this type, stationary conditions are immediately reached in the reactor.

When amorphous copolymers of ethylene, propylene and two or more monomers of the aforementioned classes are to be produced, a molar ratio between ethylene and propylene lower than or at most equal to 1:4 should be kept in the liquid reacting phase, corresponding to an ethylene-propylene molar ratio in the gaseous phase under normal conditions, lower than or at most equal to 1:1. Molar ratios between 1:200 and 1:4 in the liquid phase are usually preferred.

When the aliphatic alpha-olefin is butene-1, instead of propylene, the ratio between ethylene and butene-1 in the liquid phase must be lower than or at most equal to 1:20, corresponding to an ethylene/butene-1 ration in the gaseous phase under normal conditions lower than or at most equal to 1:15.

Molar ratios, in the liquid phase, between 1:1,000 and 1:20, are usually preferred.

By operating under these conditions, amorphous copolymers containing less than about 75% by mols of ethylene are obtained. Above about 75% by mols of ethylene, the copolymer shows a crystallinity of polyethylenic type.

The lower limit of the ethylene constant is not critical; it is however preferable that the copolymers contain at least 5% by mols of ethylene.

The higher alpha-olefin content of the amorphous copolymer can vary from a minimum of 5% by mols to a maximum of 95% by mols.

The content of the monomers belonging to two or more of the classes consisting of alkenyl cycloalkenes, monocyclic non-conjugated polyenes, non-conjugated aliphatic dienes, and cyclic monoolefins is preferably between 0.1 and 20% by mols. The amounts of each diene or polyene in the product may range from 5 to 95% of the total polyene content.

The upper limit can also be raised but, for economical reasons, it is not convenient to exceed a content of 20% by mols.

If amorphous binary copolymers of ethylene with the alkenyl cycloalkenes, monocyclic non-conjugated polyenes, non-conjugated aliphatic dienes or cyclic monoolefins are desired, the total content of the last mentioned monomers in the copolymer should be higher than 25% by mols.

The following examples illustrate the invention without limiting its scope:

EXAMPLE 1

The reaction apparatus consists of a glass cylinder having a diameter of 7.5 cm. and a capacity of 1000 cc. provided with an agitator and inlet and outlet pipes for the gases, immersed in a thermostatic bath at −20° C. The gas inlet pipe reaches the cylinder bottom and ends with a porous diaphragm (diameter 3.5 cm.).

700 cc. anhydrous n-heptane and a monomeric mixture containing 25 cc. of 1,5-cyclooctadiene and 1.25 cc. of 1,7-octadiene, obtained by pyrolysis of a mixture of cyclooctadiene and cyclooctene prepared by partial hydrogenation of cyclooctadiene, are introduced into the reactor kept under nitrogen atmosphere.

Through the gas inlet pipe a gaseous ethylene-propylene mixture in the molar ratio 1:2 is introduced and circulated with a rate of 200 N l./h.

The catalyst is preformed in a 100 cc. flask kept at −20° C. under nitrogen by reacting 1 millimole of vanadium oxytrichloride and 5 millimols of aluminum diethyl monochloride in 30 cc. of anhydrous n-heptane.

The catalyst thus prepared is siphoned into the reactor by means of nitrogen pressure. The gaseous propyleneethylene mixture is fed and discharged continuously at the rate of 400 N l./h.

After 30 minutes from the beginning of the reaction, it is stopped by adding 20 cc. of methanol containing 0.1 g. of phenylbetanaphthylamine. The polymer is purified in a separating funnel under nitrogen by repeated treatments with aqueous hydrochloric acid and then with water, and is coagulated with acetone.

After drying under vacuum, 19.2 g. of a solid product are obtained, which is amorphous under X-rays examination, looks like an unvulcanized elastomer and is completely soluble in boiling n-heptane. The intrinsic viscosity is 2.6.

The infrared spectrographic examination shows double bonds due to the presence of copolymerized cyclooctadiene (band at 15.1 microns) and vinyl double bonds (bands at 10 and 11 microns).

100 parts by weight of the ethylene-propylene-cyclooctadiene copolymer are mixed on a laboratory roll mixer, with 1 part of phenylbetanaphthylamine, 50 parts of carbon black HAF, 2 parts of sulfur, 5 parts of zinc oxide, 1 part of tetramethylthiuram disulphide and 0.5 parts of mercaptobenzothiazole.

The mixture thus obtained is vulcanized in a press for 60 minutes at 150° C. A vulcanized lamina having the following characteristics is obtained:

| | |
|---|---|
| Tensile strength _____ kg./cm.² | 190 |
| Elongation at break _____ percent | 392 |
| Modulus at 200% _____ kg./cm.² | 96 |
| Modulus at 300% _____ kg./cm.² | 138 |
| Permanent set at break _____ percent | 7 |

EXAMPLE 2

Into reaction apparatus as described in Example 1 and kept at −20° C., 700 cc. of anhydrous n-heptane and a monomeric mixture containing 25 cc. of 1,5-cyclooctadiene and 1.25 cc. of 1,7-octadiene obtained as in Example 1, are introduced.

Through the gas inlet tube, a gaseous ethylene-propylene mixture in the molar ratio of 1:2 is introduced and circulated at the rate of 200 N l./h.

In a 100 cc. flask, the catalyst is preformed at −20° C. under nitrogen by reacting, in 30 cc. of anhydrous n-heptane, 1 millimole of vanadium tetrachloride and 3.75 millimoles of beryllium diethyl. The catalyst thus prepared is siphoned into the reactor by means of nitrogen pressure. The propylene-ethylene mixture is continuously fed and discharged at the rate of 400 N l./h.

After 6 minutes from the beginning of the reaction, it is stopped by adding 20 cc. of methanol containing 0.1 g. of phenylbetanaphthylamine. The product is purified and isolated as described in Example 1. After vacuum drying, 21.4 g. of a solid product which is amorphous at the X-rays, looks like a non-vulcanized elastomer and is completely soluble in boiling n-heptane are obtained.

The infrared spectrographic examination shows double bonds due to the presence of copolymerized cyclooctadiene (band at 15.1 microns) and of vinyl double bonds (bands at 10 and 11 microns).

The copolymer is vulcanized with the mix and the modalities of Example 1.

A vulcanized lamina having the following characteristics is thus obtained:

| | |
|---|---|
| Tensile strength _____ kg./cm.² | 198 |
| Elongation at break _____ percent | 405 |
| Modulus at 200% _____ kg./cm.² | 82 |
| Modulus at 300% _____ kg./cm.² | 142 |
| Permanent set at break _____ percent | 10 |

EXAMPLE 3

Into reaction apparatus as described in Example 1, kept at −20° C., 700 cc. of anhydrous n-heptane and a monomeric mixture containing 25 cc. of 1,5-cyclooctadiene and 1.25 cc. of 1,7-octadiene, obtained as in Example 1, are introduced.

Through the gas inlet tube, a gaseous ethylene-propylene mixture in the molar ratio of 1:2, is introduced and circulated at the rate of 200 N l./h.

In a 100 cc. flask the catalyst is preformed at −20° C. under nitrogen, by reacting in 30 cc. of anhydrous n-heptane, 1 millimole of vanadium tetrachloride and 5 millimoles of aluminum ethyl sesquichloride (1/2Al₂Et₃Cl₃).

The catalyst thus performed is siphoned into the reactor by means of nitrogen pressure. The ethylene-propylene mixture is continuously fed and discharged at the rate of 400 N l./h.

3 minutes after starting, the reaction is stopped by adding 20 cc. of methanol containing 0.1 g. of phenylbetanaphthylamine.

The product is purified and isolated as described in Example 1. After vacuum drying, 16 g. of a solid product which is amorphous under X-rays examination, looks like a non-vulcanized elastomer and is completely soluble in boiling n-heptane are obtained.

The infrared spectrographic examination shows double bonds due to the presence of copolymerized cyclooctadiene (band at 15.1 microns) and of vinyl double bonds (bands at 10 and 11 microns).

The copolymer is vulcanized with the mix and under the conditions of Example 1.

A vulcanized sheet is obtained, having the following characteristics:

| | |
|---|---|
| Tensile strength _____ kg./cm.² | 190 |
| Elongation at break _____ percent | 415 |
| Modulus at 200% _____ kg./cm.² | 87 |
| Modulus at 300% _____ kg./cm.² | 156 |
| Permanent set at break _____ percent | 5 |

EXAMPLE 4

Into apparatus as described in Example 1, kept at −20° C., 700 cc. of anhydrous n-heptane and a mixture containing 25 cc. of 1,5-cyclo-octadiene and 1.25 cc. of 1,7-ocadiene, obtained as in Example 1, are introduced.

Through the gas inlet tube a gaseous ethylene-propylene mixture, in the molar ratio of 1:3 is introduced and circulated at the rate of 200 N l./h.

In a 100 cc. flask, the catalyst is preformed at −20° C. under nitrogen atmosphere by reacting, in 30 cc. of anhydrous n-heptane, 1 millimole of vanadium oxytrichloride and 5 millimoles of aluminum ethyl sesquichloride.

The catalyst thus preformed is siphoned into the reactor by means of nitrogen pressure. The gaseous ethylene-propylene mixture is continuously fed and discharged at the rate of 400 N l./h.

20 minutes after starting, the reaction is stopped by adding 20 cc. of methanol containing 0.1 g. of phenylbetanaphthylamine. The product is purified and isolated as described in Example 1.

After vacuum drying, 14.5 g. of solid product which is amorphous at the X-rays, looks like a non-vulcanized elastomer and is completely soluble in boiling n-heptane, are obtained.

The infrared spectrographic examination shows double bonds due to the presence of copolymerized cyclooctadiene (band at 15.1 microns) and vinyl double bonds (bands at 10 and 11 microns).

The copolymer has a Mooney viscosity of 85, measured at 100° C.

The polymer is vulcanized with the same mix and under the same conditions as in Example 1.

A vulcanized sheet is obtained, having the following characteristics:

Tensile strength _____ kg./cm.$^2$__ 195
Elongation at break _____ percent__ 380
Modulus at 200% _____ kg./cm.$^2$__ 100
Modulus at 300% _____ kg./cm.$^2$__ 137
Permanent set at break _____ percent__ 12

EXAMPLE 5

Into reaction apparatus as described in Example 1, kept at −20° C., 700 cc. of anhydrous n-heptane and a mixture containing 25 cc. of 1,5-cyclooctadiene and 1.25 cc. of 1,7-octadiene obtained as in Example 1, are introduced.

Through the gas inlet tube a gaseous ethylene-propylene mixture in the molar ratio of 1:2 is introduced at the rate of 200 N l./h.

In a 100 cc. flask, the catalyst is preformed by operating at −20° C. under nitrogen and by reacting 1 millimole of vanadium tetrachloride and 5 millimoles of aluminum diethylmonochloride in 30 cc. of anhydrous n-heptane.

The catalyst thus preformed is siphoned into the reactor by means of nitrogen pressure. The ethylene-propylene mixture is continuously fed and discharged at the rate of 400 N l./h.

After 4 minutes from the beginning the reaction is stopped by addition of 20 cc. of methanol containing 0.1 g. of phenylbetanaphythylamine.

The product is purified and isolated as described in Example 1.

After vacuum drying, 25.3 g. of a solid product which is amorphous under X-rays examination, is completely soluble in boiling n-heptane and looks like a non-vulcanized elastomer are obtained.

The infrared spectrographic examination shows double bonds due to the presence of copolymerized cyclooctadiene (band at 15.1 microns) and vinyl double bonds (bands at 10 and 11 microns). The copolymer has a Mooney viscosity of 85, measured at 100° C.

The polymer is vulcanized with the mix and the modalities of Example 1.

A vulcanized sheet having the following characteristics is obtained:

Tensile strength _____ kg./cm.$^2$__ 185
Elongation at break _____ percent__ 390
Modulus at 300% _____ kg./cm.$^2$__ 130

EXAMPLE 6

Into reaction apparatus as described in Example 1, kept at −20° C., 700 cc. of anhydrous n-heptane and a monomeric mixture containing 25 cc. of 1,5-cyclooctadiene and 1.25 cc. of 1,7-octadiene, obtained as in Example 1, are introduced.

Through the gas inlet tube a gaseous ethylene-propylene mixture in the molar ratio of 1:2 is introduced and circulated at the rate of 200 N l./h.

In a 100 cc. flask the catalyst is preformed at −20° C. by reacting 1-millimole of vanadium tetrachloride and 2.5 millimoles of aluminum trihexyl in 30 cc. of anhydrous n-heptane.

The catalyst thus preformed is siphoned into the reactor under nitrogen pressure.

The ethylene-propylene mixture is continuously fed and discharged at the rate of 400 N l./h.

After 9 minutes from the beginning of the reaction, it is stopped by addition of 20 cc. of methanol containing 0.1 g. of phenylbetanaphthylamine. The product is purified and isolated as described in Example 1.

After vacuum drying, 18.5 g. of a solid product which is amorphous under X-rays examination, looks like a non-vulcanized elastomer and is completely soluble in boiling n-heptane, are obtained.

The infrared spectrographic analysis shows double bonds due to the presence of copolymerized cyclooctadiene (band at 15.1 microns) and vinyl double bonds (bands at 10 and 11 microns).

The copolymer is vulcanized by using the mix and the modalities described in Example 1.

A vulcanized lamina having the following characteristics is thus obtained:

Tensile strength _____ kg./cm.$^2$__ 185
Elongation at break _____ percent__ 390
Modulus at 200% _____ kg./cm.$^2$__ 78
Modulus at 300% _____ kg./cm.$^2$__ 136

EXAMPLE 7

Into reaction apparatus as described in Example 1, kept at −20° C., 350 cc. of anhydrous n-heptane and 6 cc. of a monomeric mixture obtained by partial pyrolysis of cyclooctene and containing cyclooctene and octadiene-1,7 in the molar ratio of 2:1, are introduced.

Through the gas inlet tube a gaseous ethylene-propylene mixture in the molar ratio of 1:2 is introduced and circulated at the rate of 450 N l./h.

In a 100 cc. flask the catalyst is preformed at −20° C. under nitrogen by reacting 1 millimole of vanadium tetrachloride and 2.5 millimoles of aluminum trihexyl in 30 cc. of anhydrous n-heptane.

The catalyst thus preformed is siphoned into the reactor under nitrogen pressure.

The gaseous ethylene-propylene mixture is continuously fed and discharged at the rate of 450 N l./h.

After 7 minutes from the beginning of the reaction, it is stopped by addition of 20 cc. of methanol containing 0.1 g. of phenylbetanaphthylamine.

The product is purified and isolated as described in Example 1.

After vacuum drying, 26 g. of a solid product which appears to be amorphous under X-rays examination, looks like a non-vulcanized elastomer and is completely soluble in boiling n-heptane, are obtained.

The infrared spectrographic examination shows the presence of vinyl groups (bands at 10 to 11 microns) of methyls (band at 7.25 microns) and of methylenic sequences having different lengths (zone between 13 and 14 microns).

The presence of copolymerized cyclooctene can be demonstrated by carrying out a copolymerization with the same modalities, and using radioactive cyclooctene.

The copolymer is vulcanized with the mix and the modalities described in Example 1.

A vulcanized lamina having the following characteristics is thus obtained:

Tensile strength _____ kg./cm.$^2$__ 188
Elongation at break _____ percent__ 470
Modulus at 300% _____ kg./cm.$^2$__ 127

EXAMPLE 8

Into reaction apparatus as described in Example 1, kept at −20° C. 700 cc. of anhydrous n-heptane and 20 cc. of monomeric mixture obtained by pyrolysis of cyclooctadiene partially hydrogenated to cyclooctene and containing octadiene-1,7 and 4-vinyl-cyclohexene-1 in the molar ratio of 1:10 are introduced.

Through the gas inlet tube, a gaseous ethylene-propylene mixture having a molar ratio of 1:2 is introduced and circulated at the rate of 450 N l./h.

In a 100 cc. flask the catalyst is preformed at −20° C. under nitrogen by reacting, in 30 cc. of anhydrous n-heptane, 1 millimole of vanadium tetrachloride and 5 millimoles of aluminum diethylmonochloride.

The catalyst thus preformed is siphoned into the reactor by means of nitrogen pressure. The gaseous ethylene-propylene mixture is continuously fed and discharged at the rate of 400 N l./h.

12 minutes after starting, the reaction is stopped by adding 20 cc. of methanol containing 0.1 g. of phenyl-betanaphthylamine.

The product is purified and isolated as described in Example 1.

After vacuum drying, 28 g. of solid product which is amorphous at the X-rays, looks like a non-vulcanized elastomer and is completely soluble in boiling n-heptane, are obtained.

The infrared spectrographic examination shows the presence of vinyls (bands at 10 and 11 microns) and of copolymerized vinylcyclohexene (band at 15.25 microns). The ethylene/propylene molar ratio is about 1:1.

The copolymer is vulcanized with the mix and the modalities of Example 1. A vulcanized sheet having the following characteristics is obtained:

Tensile strength _____ kg./cm.² __ 180
Elongation at break _____ percent __ 460
Modulus at 300% _____ kg./cm.² __ 122

EXAMPLE 9

Into reaction appartus as described in Example 1, kept at −20° C., 700 cc. of anhydrous n-heptane and a mixture consisting of 25 cc. of 1,5-cyclooctadiene and 1.25 cc. of 1,7-octadiene, obtained as in Example 1, are introduced.

Through the gas inlet tube a gaseous ethylene-propylene mixture in the molar ratio of 1:4 is introduced and circulated at the rate of 200 N l./h.

In a 100 cc. flask, the catalyst is preformed at −20° C. under nitrogen by reacting, in 30 cc. of toluene, 1.4 millimoles of vanadium trichloride tetrahydrofuranate and 7 millimoles of aluminum diethyl monochloride.

The catalyst thus preformed is kept at −20 C. for 5 minutes and is then siphoned into the reactor by means of nitrogen pressure. The gaseous ethylene-propylene mixture is continuously fed and discharged at the rate of 400 N l./h.

13 minutes after starting, the reaction is stopped by adding 20 cc. of methanol containing 0.1 g. of phenyl-betanaphthylamine.

The product is purified and isolated as described in Example 1.

After vacuum drying, 28 g. of solid product which is amorphous under X-rays examination, is completely soluble in boiling n-heptane and looks like a non-vulcanized elastomer, are obtained.

The infrared spectrographic examination shows the presence of copolymerized cyclooctadiene (band at 15.1 microns) and of vinyl double bonds (bands at 10 and 11 microns). The ethylene-propylene molar ratio is about 1:1.

The polymer is vulcanized with the mix and the modalities described in Example 1.

A vulcanized sheet, having the following characteristics is obtained:

Tensile strength _____ kg./cm.² __ 180
Elongation at break _____ percent __ 520
Modulus at 300% _____ kg./cm.² __ 105

EXAMPLE 10

Into reaction apparatus as described in Example 1, kept at −10° C., 700 cc. of anhydrous n-heptane and a mixture containing 2.5 cc. of 1,5-cyclooctadiene and 1.25 cm.³ of 1,7-octadiene, obtained as in Example 1, are introduced.

Through the gas inlet tube a gaseous ethylene-butene-1 mixture, in the molar ratio of 1:3 is introduced and circulated at the rate of 200 N l./h.

In a 100 cc. flask, the catalyst is performed at −10° C. under nitrogen atmosphere, by reacting, in 30 cc. of anhydrous n-heptane, 1 millimole of vanadium tetrachloride and 5 millimoles of aluminum diethyl monochloride.

The catalyst thus preformed is siphoned into the reactor by means of nitrogen pressure. The ethylene-butene-1 mixture is continuously fed and discharged at the rate of 400 N l/h.

7 minutes after starting, the reaction is stopped by adding 20 cc. of methanol containing 0.1 g. of phenyl-betanaphthylamine. The product is purified and isolated as described in Example 1.

After vacuum drying, 26 g. of a solid product which is amorphous under X-rays examination, looks like a non-vulcanized elastomer and is completely soluble in boiling n-heptane, are obtained.

The infrared spectrographic examination shows the presence of copoylmerized cyclooctadiene (band at 15.1 microns) and of vinyl double bonds (bands at 10 and 11 microns).

The copolymer is vulcanized with the mix and modalities of Example 1.

A vulcanized sheet is obtained, having the following characteristics:

Tensile strength _____ kg./cm.² __ 210
Elongation at break _____ percent __ 380
Modulus at 300% _____ kg./cm.² __ 153

EXAMPLE 11

Into reaction apparatus as described in Example 9, kept at −20° C., 700 cc. of anhydrous n-heptane and a mixture containing 25 cc. of 1,7-octadiene, obtained as in Example 1, are introduced.

Through the gas inlet tube a gaseous ethylene-propylene mixture in the molar ratio of 1:4 is introduced at the rate of 200 N l./h.

In a 100 cc. flask, the catalyst is preformed at −20° C. under nitrogen by reacting 2.8 millimoles of vanadium triacetylacetonate and 14 millimoles of aluminum diethylmonochloride in 30 cc. of anhydrous toluene.

The catalyst thus preformed is siphoned into the reactor under nitrogen pressure. The gaseous ethylene-propylene mixture is continuously fed and discharged at a rate of 500 N l./h.

12 minutes after starting, the reaction is stopped by adding 20 cc. of methanol containing 0.1 g. of phenyl-betanaphthylamine.

The product is purified and isolated as described in Example 1.

After vacuum drying, 26.8 g. of a solid product which is amorphous under X-rays examination, is completely soluble in boiling n-heptane, and looks like a non-vulcanized elastomer are obtained.

The infrared spectrographic examination shows the presence of copolymerized cyclooctadiene (band at 15.1 microns) and of vinyl double bonds (bands at 10 and 11 microns). The ethylene/propylene molar ratio is about 1:1.

The copolymer is vulcanized with the mix and the modalities described in Example 1.

A vulcanized sheet having the following characteristics is obtained:

Tensile strength _____ kg./cm.² __ 174
Elongation at break _____ percent __ 540
Modulus at 300% _____ kg./cm.² __ 97
Permanent set _____ percent __ 12

As will be apparent, changes may be made in details in practicing the invention without departing from the spirit

What is claimed is:

1. Vulcanizable, substantially linear, amorphous copolymers having a molecular weight above 20,000, as determined by intrinsic viscosity measurements, consisting essentially of unsaturated macromolecules made up of randomly distributed copolymerized units of
   (1) ethylene, in an amount of from at least 5% to 75% by mols;
   (2) conversely, from at least 5% to 95% by mols of at least one aliphatic alpha-olefin having the formula R—CH=CH$_2$ in which R is an alkyl group containing 1 to 6 carbon atoms;
   (3) and conversely from 0.1 to 20% by mols of octadiene 1,7 and at least one monomer selected from the group consisting of cyclooctadiene 1,5 and 4-vinylcyclohexene-1.

2. Copolymers according to claim 1, consisting essentially of unsaturated macromolecules made up of randomly distributed copolymerized units of
   (1) ethylene;
   (2) at least one aliphatic alpha-olefin selected from the group consisting of propylene and butene-1; and
   (3) octadiene 1,7 and at least one monomer selected from the group consisting of cyclooctadiene 1,5 and 4-vinylcyclohexene-1.

3. The copolymers of claim 1, sulfur-cured to an elastomeric material.

4. The process for preparing the vulcanizable, substantially linear, amorphous copolymers of claim 1, which comprises reacting a mixture of the selected monomers, in liquid phase, at a temperature between −80 and +125° C., in contact with a catalyst obtained by mixing:
   (1) a vanadium compound selected from the group consisting of
       (a) vanadium halides and vanadium oxyhalides, and
       (b) vanadium compounds in which at least one of the vanadium valences is satisfied by a heteroatom selected from the group consisting of oxygen and nitrogen linked to an organic group, with
   (2) an organometallic compound of a metal selected from the group consisting of beryllium and aluminum, at least one of the catalyst-forming components (1) and (2) containing halogen.

5. The process of claim 4, characterized in that the preparation of the catalyst and the polymerization are carried out at temperatures ranging from 0° to −80° C.

6. The process of claim 4, characterized in that the catalyst is obtained by mixing a vanadium compound selected from the group consisting of vanadium triacetylacetonate, vanadium alkoxides and vanadium haloalkoxides and an aluminum alkyl halide, at a temperature ranging between 0 and +125° C., and the mixed monomers are copolymerized in contact with said catalyst at a temperature in said range, and in the presence of from about 0.05 to 1.0 mole per mole of alkylaluminum halide, of a complexing agent selected from the group consisting of ethers of the formula RYR' in which Y is selected from the group consisting of oxygen and sulfur and R and R' each represents a member selected from the group consisting of linear and branched alkyl radicals containing from 1 to 14 carbon atoms and aromatic nuclei containing from 6 to 14 carbon atoms, at least one of the R and R' being branched alkyl radical; ethers of said formulae RYR' in which at least one of R and R' is an aromatic nucleus; tertiary amines of the formula

in which R, R' and R" each represents a member selected from the group consisting of alkyl radicals containing 1 to 14 carbon atoms and aromatic nuclei containing 6 to 14 carbon atoms, at least one of R, R' and R" being an aromatic nucleus; and tertiary phosphines of the formula:

in which R, R' and R" each represents a member selected from the group consisting of alkyl radicals containing from 1 to 14 carbon atoms and aromatic nuclei containing from 6 to 14 carbon atoms, at least one of R, R' and R" being an aromatic nucleus.

7. The process of claim 4, characterized in that the mixture of the selected monomers comprises ethylene and propylene and the molar ratio of propylene to ethylene maintained in the liquid reacting phase is at least 4:1.

8. The process of claim 4, characterized in that the mixture of the selected monomers comprises ethylene and butene-1 and the molar ratio of butene-1 to ethylene maintained in the liquid reacting phase is at least 20:1.

References Cited

UNITED STATES PATENTS 2,933,480  4/1960  Gresham et al.
3,260,708  7/1966  Natta et al.

JAMES A. SEIDLECK, *Primary Examiner.*

U.S. Cl. X.R.

260—33.6, 41.5, 80.78